(12) United States Patent
Moulthrop et al.

(10) Patent No.: US 6,652,732 B2
(45) Date of Patent: Nov. 25, 2003

(54) FAN FLOW SENSOR FOR PROTON EXCHANGE MEMBRANE ELECTROLYSIS CELL

(75) Inventors: Lawrence C. Moulthrop, Windsor, CT (US); Ricky S. Scott, Clinton, CT (US); Charles Bennet McCollough, Enfield, CT (US); Richard A. Dubey, Jr., Torrington, CT (US); A. John Speranza, West Hartford, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 0 days.

(21) Appl. No.: 09/909,253

(22) Filed: Jul. 19, 2001

(65) Prior Publication Data

US 2002/0023834 A1 Feb. 28, 2002

Related U.S. Application Data

(60) Provisional application No. 60/219,525, filed on Jul. 20, 2000.

(51) Int. Cl.[7] .............................. C25B 15/02; C25C 1/00
(52) U.S. Cl. ...................... 205/335; 204/228.3; 429/22; 73/19.04; 73/19.05
(58) Field of Search ........................... 429/22; 205/335; 204/228.3, 279, 242, 266; 73/79.04, 19.05

(56) References Cited

U.S. PATENT DOCUMENTS

| | | | |
|---|---|---|---|
| 3,608,505 A | 9/1971 | Rosenberg et al. | 110/8 A |
| 3,755,128 A | 8/1973 | Herwig | 204/230 |
| 3,992,598 A | 11/1976 | Welsh et al. | 200/81.9 M |
| 4,002,552 A * | 1/1977 | Bunn et al. | 204/228.2 |
| 4,609,346 A * | 9/1986 | Siccardi | 432/222 |
| 4,713,654 A | 12/1987 | Sweany | 340/671 |
| 4,767,498 A | 8/1988 | Kreisler | 159/47.3 |
| 4,837,537 A | 6/1989 | Nakada et al. | 335/153 |
| 4,964,392 A | 10/1990 | Bruno et al. | 126/21 A |
| 5,200,278 A | 4/1993 | Watkins et al. | 429/24 |
| 5,302,268 A | 4/1994 | Layzell et al. | 204/228 |
| 5,629,659 A | 5/1997 | Steiner | 335/205 |
| 5,736,016 A * | 4/1998 | Allen | 204/237 |
| 5,935,726 A | 8/1999 | Chow et al. | 429/13 |
| 6,083,637 A | 7/2000 | Walz et al. | 429/17 |
| 2002/0157942 A1 * | 10/2002 | Dubey | 204/228.3 |

* cited by examiner

Primary Examiner—Roy King
Assistant Examiner—Wesley A. Nicolas
(74) Attorney, Agent, or Firm—Cantor Colburn LLP

(57) ABSTRACT

A fan flow sensor for a gas generating proton exchange member electrolysis cell includes a switching device and a sail disposed in communication with the switching device. The sail is pivotally mounted and movable in response to an airflow from a fan. The sail is further configured to actuate the switching device in response to the airflow from the fan.

2 Claims, 4 Drawing Sheets

FAN FLOW SENSOR FOR PROTON EXCHANGE MEMBRANE ELECTROLYSIS CELL

CROSS REFERENCE TO RELATED APPLICATION

This application claims the benefits of U.S. Provisional Patent Application Ser. No. 60/219,525 filed Jul. 20, 2000, and is related to U.S. patent application Ser. No. 09/842,617 filed Apr. 25, 2001, and now U.S. Pat. No. 6,524,464 the entire contents of both applications being incorporated herein by reference.

BACKGROUND

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of the water are discharged from cell 10, while protons 15 and a second portion 24 of the water migrate across a proton exchange membrane 26 to cathode 20. At cathode 20, hydrogen gas 28 is removed, generally through a gas delivery line. The removed hydrogen gas 28 is usable in a myriad of different applications. Second portion 24 of water, which is entrained with hydrogen gas, is also removed from cathode 20.

An electrolysis cell system may include a number of individual cells arranged in a stack with reactant water 12 being directed through the cells via input and output conduits formed within the stack structure. The cells within the stack are sequentially arranged, and each one includes a membrane electrode assembly defined by a proton exchange membrane disposed between a cathode and an anode. The cathode, anode, or both may be gas diffusion electrodes that facilitate gas diffusion to the proton exchange membrane. Each membrane electrode assembly is in fluid communication with flow fields adjacent to the membrane electrode assembly, defined by structures configured to facilitate fluid movement and membrane hydration within each individual cell.

Power to the electrolysis cell is interrupted when, after sensing a condition such as a pressure variation in the gas delivery line, a control unit signals an electrical source that drives a reference voltage applied across a potentiometer to an extreme value. In such a system, the control unit is directly dependent upon the detection of a mass leak from the gas delivery line. Depending upon the preselected conditions of the system, when the power interruption capability is dependent upon the detection of a mass leak, a delay between the time that the leak occurs and the time at which the system is shut down may be experienced. Such systems do not provide early detection of potential problems but instead simply react to signals indicative of problems currently existing in the operation of the cell.

SUMMARY

A fan flow sensor for a gas generating proton exchange membrane electrolysis cell is disclosed. The fan flow sensor includes a switching device and a sail disposed in communication with the switching device. The sail is pivotally mounted and configured to actuate the switching device in response to an airflow from a fan.

DETAILED DESCRIPTION

Figure 2:
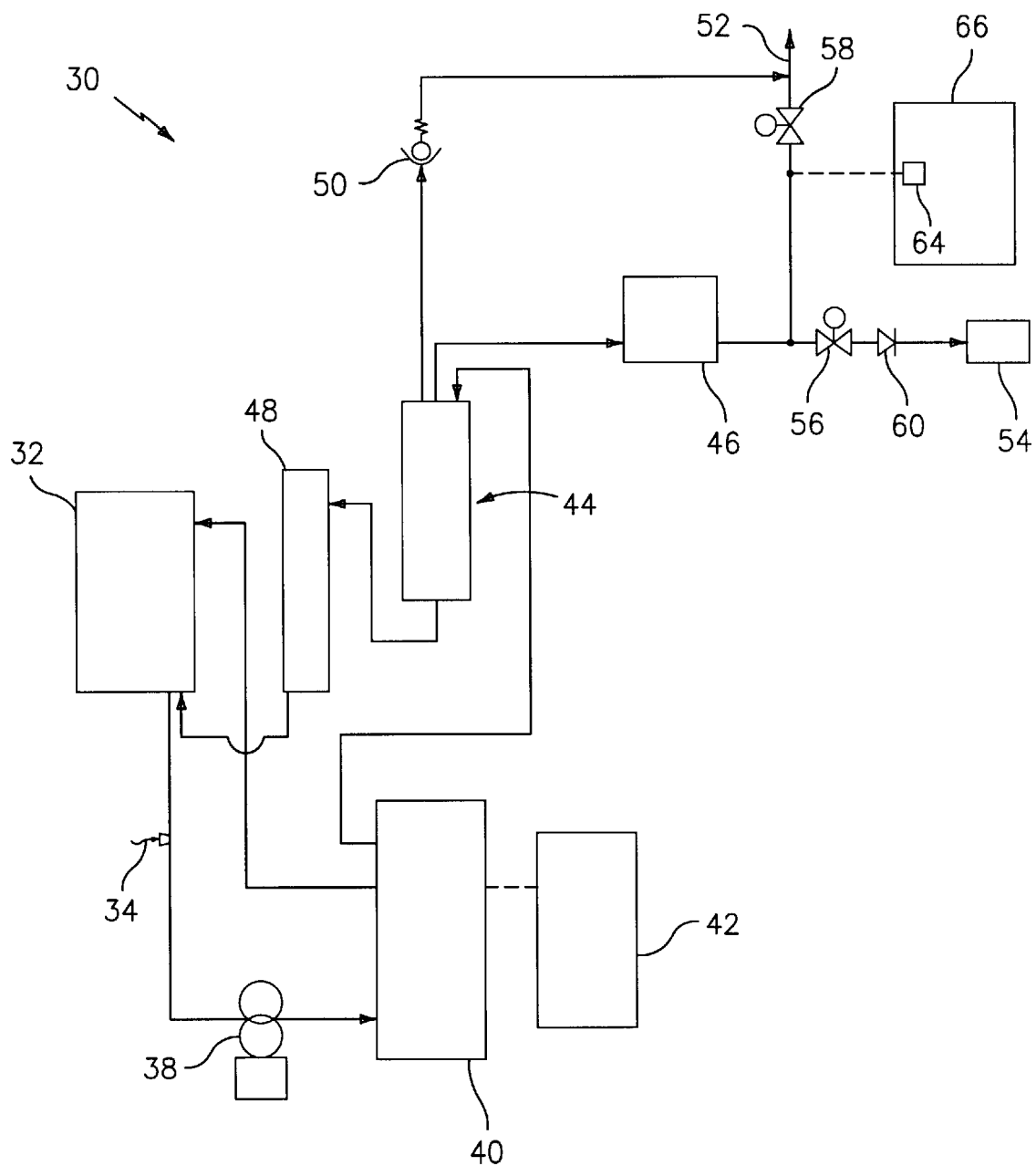
FIG. 2 is a schematic representation of a gas generating electrolysis cell system into which an electrolysis cell may be incorporated.

Referring to FIG. 2, an exemplary embodiment of an electrolysis cell system is shown generally at 30 and is hereinafter referred to as "system 30." System 30 is suitable for generating hydrogen for use in gas chromatography, as a fuel, and for various other applications. It is to be understood that while the inventive improvements described below are described in relation to an electrolysis cell, the improvements are generally applicable to both electrolysis and fuel cells. Furthermore, although the description and figures are directed to the production of hydrogen and oxygen gas by the electrolysis of water, the apparatus is applicable to the generation of other gases from other reactant materials.

Exemplary system 30 includes a water-fed electrolysis cell capable of generating gas from reactant water and is operatively coupled to a control system. Suitable reactant water is deionized, distilled water and is continuously supplied from a water source 32. The reactant water utilized by system 30 is stored in water source 32 and is fed by gravity or pumped through a pump 38 into an electrolysis cell stack 40. The supply line, which is preferably clear plasticizer-free tubing, includes an electrical conductivity sensor 34 disposed therewithin to monitor the electrical potential of the water, thereby determining its purity and ensuring its adequacy for use in system 30.

Figure 1:
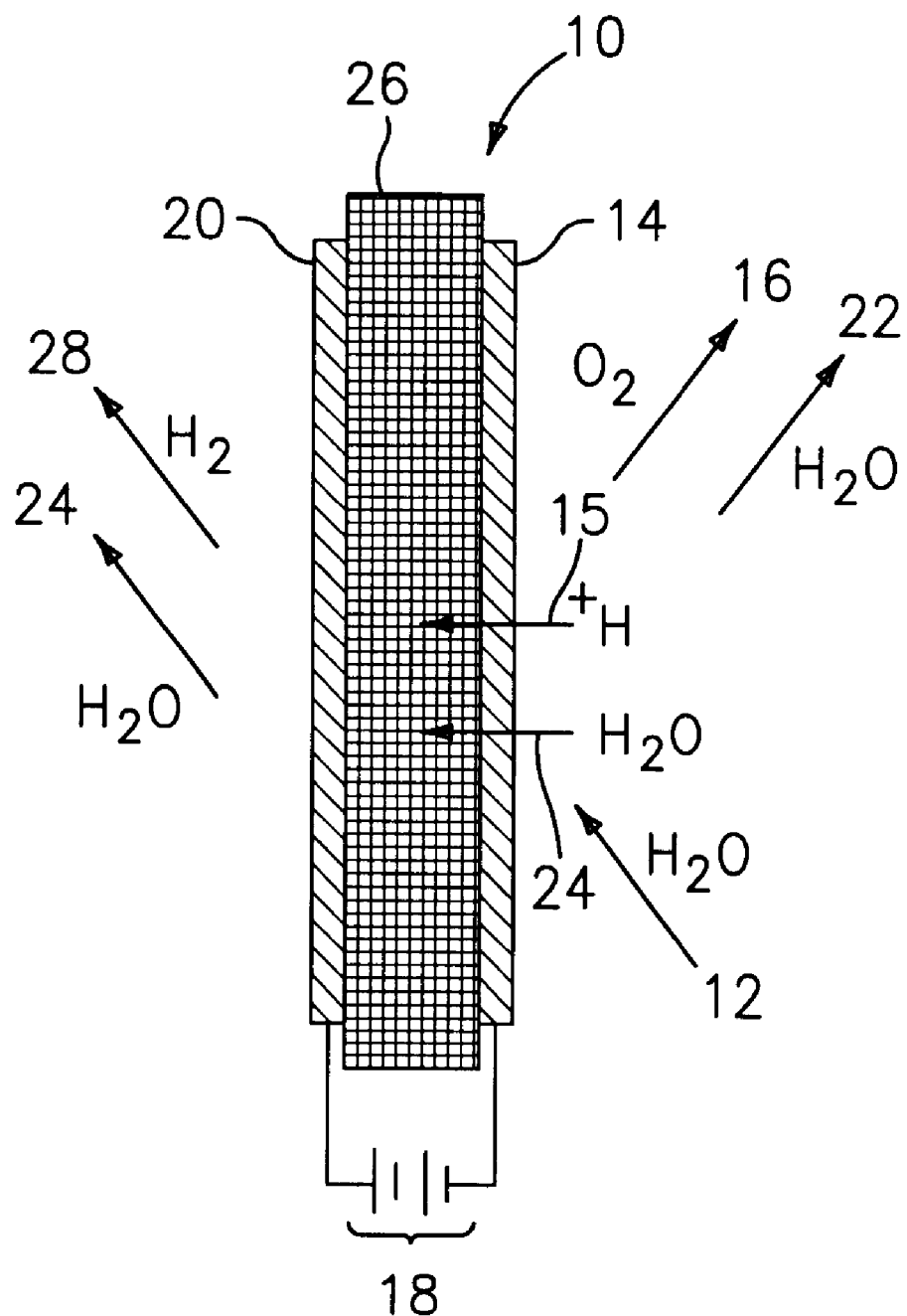
FIG. 1 is a schematic representation of an anode feed electrolysis cell of the prior art.

Cell stack 40 comprises a plurality of cells similar to cell 10 described above with reference to FIG. 1 encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water.

Oxygen and water exit cell stack 40 via a common stream and are ultimately returned to water source 32, whereby the water is recycled and the oxygen is vented to the atmosphere. The hydrogen stream, which contains water, exits cell stack 40 and is fed to a phase separation tank, which is a hydrogen/water separation apparatus 44, hereinafter referred to as "separator 44" where the gas and liquid phases are separated. This hydrogen stream has a pressure that is preferably about 250 pounds per square inch (psi), but which may be anywhere from about 1 psi to about 6000 psi. Some water is removed from the hydrogen stream at separator 44.

The exiting hydrogen gas (having a lower water content than the hydrogen stream to separator 44) is further dried at a dryer 46, which may be a diffuser, a pressure swing absorber, or desiccant. Water with trace amounts of hydrogen entrained therein is returned to water source 32 through a low pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a preselected limit.

Pure hydrogen from dryer 46 is fed to a hydrogen storage 54. Valves 56, 58 are provided at various points on the system lines and are configured to release hydrogen to vent 52 under certain conditions. Furthermore, a check valve 60 is provided that prevents the backflow of hydrogen to dryer 46 and separator 44.

A ventilation system, shown below with reference to FIGS. 3 through 6, is provided to assist in venting system gases when necessary. The ventilation system comprises a fan portion that continually purges the air in the enclosure of system 30. An airflow switch is mounted on the fan portion and is configured to interrupt the power to cell stack 40 in the event of a failure in the fan portion, thereby halting the production of hydrogen gas.

A hydrogen output sensor 64 is incorporated into system 30. Hydrogen output sensor 64 may be a pressure transducer that converts the gas pressure within the hydrogen line to a voltage or current value for measurement. However, hydrogen output sensor 64 can be any suitable output sensor other than a pressure transducer, including, but not limited to, a flow rate sensor, a mass flow sensor, or any other quantitative sensing device. Hydrogen output sensor 64 is interfaced with a control unit 66, which is capable of converting the voltage or current value into a pressure reading. Furthermore, a display means (not shown) may be disposed in operable communication with hydrogen output sensor 64 to provide a reading of the pressure, for example, at the location of hydrogen output sensor 64 on the hydrogen line. Control unit 66 is any suitable gas output controller, such as an analog circuit or a digital microprocessor.

Figure 3:
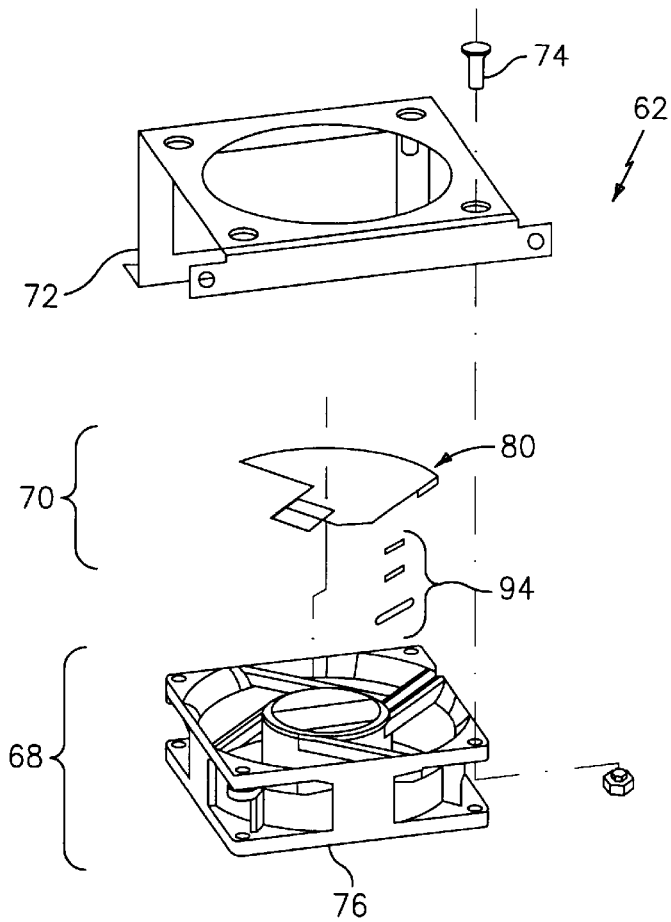
FIG. 3 is an exploded perspective view of a ventilation system of a gas generating electrolysis cell system.
Figure 4:
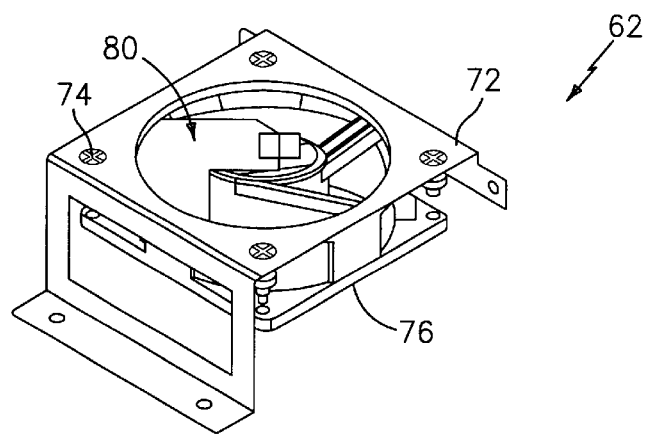
FIG. 4 is a perspective view of the ventilation system of FIG. 3.

Referring now to FIGS. 3 and 4, an exemplary embodiment of the ventilation system is shown generally at 62. Ventilation system 62 comprises a fan portion, shown generally at 68, and a fan flow sensor portion, shown generally at 70, disposed in operable communication with fan portion 68. Fan portion 68 and fan flow sensor portion 70 are mounted within the electrolysis cell system with a bracket 72. Fasteners 74 extending through bracket 72 enable fan portion 68 to be secured to bracket 72. Fan portion 68 comprises an impeller (not shown) rotatably mounted within a housing 76 and driven by a motor (not shown), which may be a 12 volt DC motor. The impeller provides ventilation within the enclosure of the system via a continual purge of air at a rate such that if the full production of hydrogen were to leak into the enclosure, the hydrogen would be vented outside the enclosure and diluted to a very low concentration. Fan flow sensor portion 70 comprises an airflow switch, shown generally at 94, and a sail, shown generally at 80, configured to receive the airflow from fan portion 68.

The operation of fan portion 68 is monitored by airflow switch 94, which is electronically configured to interrupt the flow of electrical current to the cell stack in the event that ventilation system 62 is malfunctioning or has failed altogether. Airflow switch 94 functions independent of the delivery line pressure of the hydrogen gas and comprises a reed switch. In the event of the malfunctioning or failure of fan portion 68, discontinuity of two separate reeds in the reed switch causes the interruption of current to the cell stack.

Figure 5:
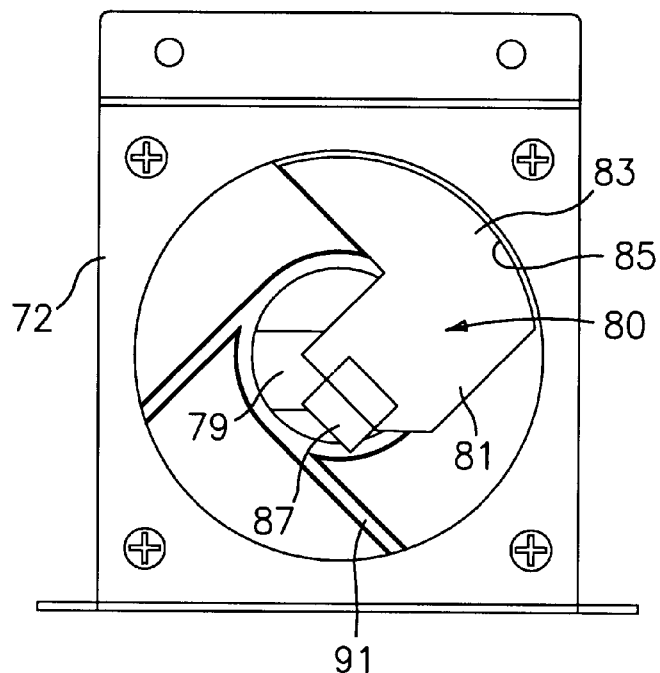
FIG. 5 is a plan view of the ventilation system of FIG. 3.

Referring to FIG. 5, sail 80 is described in greater detail. Sail 80 is illustrated as being a substantially L-shaped planar member having a pivotal leg 81 and a radial leg 83. Radial leg 83 is arcuately configured along an outer edge 85 thereof to conform to the inner surface of an opening in bracket 72. Although the planar member is shown as being L-shaped and having an arcuately defined edge, it should be realized by those of skill in the art that other shapes and configurations of the sail may be utilized. A tab (shown below with reference to FIG. 6) dimensioned to accommodate the attachment of a magnet of the reed switch depends from a peripheral surface of pivotal leg 81 and extends substantially normally from the general plane of sail 80. Sail 80 is pivotally mounted to a hub 79 of the fan portion with a flexible member adhesively disposed on hub 79 and sail 80. The flexible member may be cloth/glass tape 87, which is capable of maintaining its adhesive properties in the high temperature environment characteristic of the system into which the ventilation system is incorporated. Hub 79 is supported on the fan portion by fan wiring channels 91.

Figure 6:
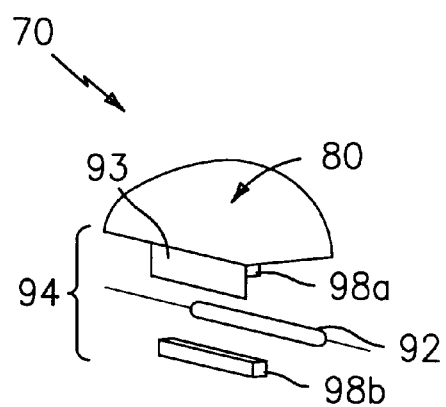
FIG. 6 is a perspective view of a tab on the sail of the ventilation system of FIG. 3 illustrating the placement of magnets used for actuating a flow switch.

Referring now to FIG. 6, fan flow sensor portion 70, and particularly the connection of airflow switch 94 to sail 80, is shown. Airflow switch 94 comprises the reed switch, shown at 92, and at least one magnet. As shown, first and second magnets 98a and 98b are disposed in actuatable communication with reed switch 92. Reed switch 92 comprises two separate reeds (not shown) that are configured to effect intermittent contact with each other in response to the positioning of magnets 98a, 98b. The tab, shown at 93, is dimensioned to accommodate the attachment of magnet 98a and depends from a peripheral surface of pivotal leg 81 and extends substantially normally from the general plane of sail 80. Sail 80 interacts with airflow switch 94 to cause the circuit to be either open or closed. Contact made between the reeds of reed switch 92 closes the electrical circuit, the detection of which is interpreted by the control unit to indicate that the ventilation system is properly functional. When the two reeds remain out of contact with each other for some period of time, the circuit is broken, and the signal to interrupt the application of current to the cell stack is transmitted to the electrical source.

Referring to all the FIGURES, reed switch 92 is fixedly mounted in a fan wiring channel (shown at 91 in FIG. 5) on housing 76 such that when sail 80 lies flat across the opening of fan portion 68, magnets 98a, 98b are in close proximity with and magnetically affect reed switch 92, thereby separating the reeds. During operation of system 30, airflow from the fan forces sail 80 to pivot off of hub 79 breaking the magnetic field and allowing the reeds to close. When the airflow is reduced or removed, sail 80 hinges back to its position on hub 79 bringing magnets 98a, 98b into close proximity with reed switch 92 and opening the circuit, thereby removing power to cell stack 40.

In order for system 30 to be shut down during operation, only ventilation system 62 needs to malfunction. By configuring the system such that the interruption of power to the system is dependent upon the malfunction or failure of ventilation system 62 instead of the pressure in the delivery line, cell stack 40 is shut down prior to any leakages of hydrogen gas. Cell stack 40 and all of its associated components except for ventilation system 62 may be in functioning order during the operation of system 30. Nevertheless, since ventilation system 62 is independent of delivery line pressure, malfunction or failure of either fan portion 68 or fan flow sensor portion 70 will signal electrical source 42 to interrupt the flow of electrical current to cell stack 40, thereby shutting down system 30.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of controlling the operation of an electrolysis cell, said method comprising:

generating an airflow at a sail disposed in airflow communication with said electrolysis cell;

moving said in response to said airflow;

actuating a magnetically actuatable reed switch in response to said moving of said sail; and separating reeds of said magnetically actuatable reed switch to open a circuit, thereby removing power to said electrolysis cell.

2. The method of claim 1, wherein said moving of said sail comprises causing said sail to pivot in response to said airflow.

* * * * *